(12) United States Patent
Moriya

(10) Patent No.: US 10,950,235 B2
(45) Date of Patent: Mar. 16, 2021

(54) INFORMATION PROCESSING DEVICE, INFORMATION PROCESSING METHOD AND PROGRAM RECORDING MEDIUM

(71) Applicant: NEC CORPORATION, Tokyo (JP)

(72) Inventor: Masato Moriya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 69 days.

(21) Appl. No.: 16/337,728

(22) PCT Filed: Sep. 15, 2017

(86) PCT No.: PCT/JP2017/033447
§ 371 (c)(1),
(2) Date: Mar. 28, 2019

(87) PCT Pub. No.: WO2018/061824
PCT Pub. Date: Apr. 5, 2018

(65) Prior Publication Data
US 2020/0043487 A1 Feb. 6, 2020

(30) Foreign Application Priority Data
Sep. 29, 2016 (JP) .............................. JP2016-191298

(51) Int. Cl.
*G10L 15/22* (2006.01)
*G10L 15/08* (2006.01)

(52) U.S. Cl.
CPC .............. *G10L 15/22* (2013.01); *G10L 15/08* (2013.01); *G10L 2015/088* (2013.01); *G10L 2015/223* (2013.01)

(58) Field of Classification Search
CPC ..... G06F 40/20; G06F 3/04883; G06Q 10/10; G10L 15/00; G10L 15/08; G10L 15/10;
(Continued)

(56) References Cited

U.S. PATENT DOCUMENTS 6,944,593 B2 * 9/2005 Kuzunuki ............... G10L 15/22
704/257
9,424,840 B1 * 8/2016 Hart ........................ G10L 15/22
(Continued)

FOREIGN PATENT DOCUMENTS

| JP | 2000-023112 A | 1/2000 |
| JP | 2003-085081 A | 3/2003 |

(Continued)

OTHER PUBLICATIONS

Written Opinion for PCT/JP2017/033447 dated Oct. 10, 2017 [PCT/ISA/237].
(Continued)

*Primary Examiner* — Gerald Gauthier
(74) *Attorney, Agent, or Firm* — Sughrue Mion, PLLC

(57) ABSTRACT

Provided are an information processing device, etc. that is capable of extracting information specific to a user from speech data. This information processing device is provided with: speech recognition means for generating a character string based on speech data; filtering means for filtering one or more keywords extracted from the character string generated by the speech recognition means, based on one or more words which are relevant to a speaker of the speech data and stored in advance; and output means for outputting a result of the filtering performed by the filtering means.

8 Claims, 17 Drawing Sheets

(58) Field of Classification Search
CPC ......... G10L 15/22; G10L 15/26; G10L 15/28;
G10L 17/00; G10L 17/005; G10L
2015/088; G10L 2015/223; G10L 17/22;
H04W 4/029; H04L 67/327
USPC ........ 370/392; 704/235, 236, 249, 270, 275;
705/14.53; 715/727, 751
See application file for complete search history.

(56) References Cited

U.S. PATENT DOCUMENTS

| | | | | |
|---|---|---|---|---|
| 9,548,049 | B2* | 1/2017 | McCullough | G10L 21/10 |
| 9,721,570 | B1* | 8/2017 | Beal | G06F 3/167 |
| 10,102,198 | B2* | 10/2018 | Astigarraga | G06F 40/289 |
| 2003/0154077 | A1* | 8/2003 | Tahara | G10L 15/10 |
| | | | | 704/239 |
| 2005/0143994 | A1* | 6/2005 | Mori | G10L 15/26 |
| | | | | 704/235 |
| 2005/0159950 | A1* | 7/2005 | Roth | G10L 15/22 |
| | | | | 704/236 |
| 2006/0126631 | A1* | 6/2006 | Wajda | H04M 3/42 |
| | | | | 370/392 |
| 2007/0185704 | A1* | 8/2007 | Yoshimura | G10L 15/26 |
| | | | | 704/10 |
| 2008/0027705 | A1* | 1/2008 | Koga | G10L 13/00 |
| | | | | 704/2 |
| 2009/0006087 | A1* | 1/2009 | Imoto | G10L 15/26 |
| | | | | 704/231 |
| 2009/0125499 | A1* | 5/2009 | Cross | H04L 67/306 |
| 2009/0204399 | A1* | 8/2009 | Akamine | G10L 15/1822 |
| | | | | 704/235 |
| 2009/0271193 | A1* | 10/2009 | Miyamoto | G10L 15/22 |
| | | | | 704/235 |
| 2009/0287491 | A1* | 11/2009 | Ishii | G10L 15/26 |
| | | | | 704/273 |
| 2010/0131534 | A1* | 5/2010 | Takeda | G06F 40/20 |
| | | | | 707/758 |
| 2011/0078585 | A1* | 3/2011 | King | G06F 16/332 |
| | | | | 715/751 |
| 2012/0101821 | A1* | 4/2012 | Tsuda | G10L 15/22 |
| | | | | 704/243 |
| 2012/0215528 | A1* | 8/2012 | Nagatomo | G10L 15/22 |
| | | | | 704/211 |
| 2012/0253804 | A1* | 10/2012 | Sugiura | G10L 15/187 |
| | | | | 704/235 |
| 2013/0117020 | A1* | 5/2013 | Chung | G06Q 30/02 |
| | | | | 704/235 |
| 2013/0339030 | A1* | 12/2013 | Ehsani | G10L 15/22 |
| | | | | 704/275 |
| 2014/0303975 | A1* | 10/2014 | Ohmura | G10L 15/22 |
| | | | | 704/235 |
| 2015/0006167 | A1* | 1/2015 | Kato | G10L 15/22 |
| | | | | 704/231 |
| 2015/0088514 | A1* | 3/2015 | Typrin | G06F 3/167 |
| | | | | 704/249 |
| 2015/0162003 | A1* | 6/2015 | Zhai | G10L 15/26 |
| | | | | 704/235 |
| 2015/0178773 | A1* | 6/2015 | Ikeda | G06Q 30/0255 |
| | | | | 705/14.53 |
| 2015/0228280 | A1* | 8/2015 | Watanabe | G06F 40/55 |
| | | | | 704/235 |
| 2015/0302848 | A1* | 10/2015 | Kurata | G10L 15/08 |
| | | | | 704/254 |
| 2016/0139877 | A1* | 5/2016 | Park | G10L 15/22 |
| | | | | 715/727 |
| 2016/0253923 | A1* | 9/2016 | Wang | G10L 25/51 |
| | | | | 434/157 |
| 2018/0068194 | A1* | 3/2018 | Matsuda | G06K 9/00436 |

FOREIGN PATENT DOCUMENTS

| | | |
|---|---|---|
| JP | 2004-362121 A | 12/2004 |
| JP | 2008-257655 A | 10/2008 |
| JP | 2009-070180 A | 4/2009 |
| JP | 2009-246495 A | 10/2009 |
| JP | 2010-079872 A | 4/2010 |
| JP | 2015-099290 A | 5/2015 |

OTHER PUBLICATIONS

International Search Report for PCT/JP2017/033447 dated Oct. 10, 2017 [PCT/ISA/210].

* cited by examiner

Fig. 6A

| TELEPHONE BOOK INFORMATION | PARTNER INFORMATION ||  CONTENT ||
|---|---|---|---|---|
| | PERSON'S NAME | PART OF SPEECH ETC | RELATED INFORMATION | PART OF SPEECH ETC |
| | TARO YAMADA | PROPER NOUN | 080-1234-5678 | PHONE NUMBER STYLE |
| | | | ab_cd@efjp | E-MAIL ADDRESS STYLE |
| | JIRO TANAKA | PROPER NOUN | 090-9876-5432 | PHONE NUMBER STYLE |

Fig. 6B

| E-MAIL INFORMATION | PARTNER INFORMATION | | CONTENT | |
|---|---|---|---|---|
| | PERSON'S NAME | PART OF SPEECH ETC | RELATED INFORMATION | PART OF SPEECH ETC |
| | P-SAN | PROPER NOUN | COMPANY A MATTER X | PROPER NOUN |
| | Q-SAN | PROPER NOUN | MATTER Y | PROPER NOUN |

Fig. 6C

| SNS INFORMATION | PARTNER INFORMATION | | CONTENT | | |
|---|---|---|---|---|---|
| | PERSON'S NAME | PART OF SPEECH ETC | RELATED INFORMATION | | PART OF SPEECH ETC |
| | D-SAN | PROPER NOUN | E-SAN | | PROPER NOUN |
| | | | NIHONBASHI | | PROPER NOUN |

Fig. 8A

```
A MEETING ON MATTER X
WILL BE HELD
AT 15 O'CLOCK
TODAY
MEETING ATTENDEES FROM THE
OTHER SIDE ON MATTER X
ARE
E-SAN AND F-SAN.
```

Fig. 8B

```
·2016/03/30
·15:00
·MATTER X
·MEETING
·MATTER X
·E-SAN
·F-SAN
```

Fig. 10A

| 2016/03/30 |
| 15:00 |
| MATTER X |
| E-SAN |

Fig. 10B

| 2016/03/30 |
| 15:00 |
| COMPANY A |
| MATTER X |
| E-SAN |

Fig. 11A

| TELEPHONE BOOK INFORMATION | PARTNER INFORMATION | | CONTENT | |
|---|---|---|---|---|
| | PERSON'S NAME | PART OF SPEECH ETC | RELATED INFORMATION | PART OF SPEECH ETC |
| | HANAKO YAMADA | PROPER NOUN | 080-1111-2222 | PHONE NUMBER STYLE |
| | | | eee@ff.jp | E-MAIL ADDRESS STYLE |
| | SABURO SUZUKI | PROPER NOUN | 090-3333-1234 | PHONE NUMBER STYLE |

Fig. 11B

| E-MAIL INFORMATION | PARTNER INFORMATION | | CONTENT | |
|---|---|---|---|---|
| | PERSON'S NAME | PART OF SPEECH ETC | RELATED INFORMATION | PART OF SPEECH ETC |
| | R-SAN | PROPER NOUN | COMPANY A MATTER X | PROPER NOUN |
| | S-SAN | PROPER NOUN | COMPANY C MATTER Z | PROPER NOUN |

Fig. 11C

| SNS INFORMATION | PARTNER INFORMATION | | CONTENT | |
| --- | --- | --- | --- | --- |
| | PERSON'S NAME | PART OF SPEECH ETC | RELATED INFORMATION | PART OF SPEECH ETC |
| | T-SAN | PROPER NOUN | E-SAN | PROPER NOUN |

# INFORMATION PROCESSING DEVICE, INFORMATION PROCESSING METHOD AND PROGRAM RECORDING MEDIUM

CROSS REFERENCE TO RELATED APPLICATIONS

This application is a National Stage of International Application No. PCT/JP2017/033447, filed on Sep. 15, 2017, which claims priority from Japanese Patent Application No. 2016-191298, filed on Sep. 29, 2016, the contents of all of which are incorporated herein by reference in their entirety.

TECHNICAL FIELD

The present invention relates to technology for extracting words from a speech.

BACKGROUND ART

Today, a great number of voice calls are made using communication terminals such as cellular phones and smartphones. There may occur a situation during a voice call where note taking is desired to be performed in order not to forget an important word having appeared in the voice call. However, there may be a case where some inconvenience occurs with regard to taking a note during a voice call on a communication terminal. For example, it is difficult for a user usually using a note-taking function of a communication terminal as a substitute for a note pad, to take a note while the user is using the communication terminal for a voice call. Further, places where the user makes a voice call on a communication terminal are not fixed. Accordingly, in such as a case of receiving a phone call when the recipient is outdoors, it is often the case that the recipient is not prepared to take a note, and it accordingly is difficult for the recipient to take a note during the voice call.

Relating to these difficulties, technology of extracting and displaying information suited to user needs on the basis of speech information, text information and the like is widely known.

For example, Patent Literature 1 (PTL 1) discloses a technology which automatically generates, from text information inputted by a user, a keyword list for identifying an important word, and extracts from input speech information a word matching any of the keywords as an important word, which is subsequently displayed.

Patent Literature 2 (PTL 2) discloses a technology which performs a program selection process on the basis of a profile including personal program preference registered by a user in advance via video equipment, feedback information collected through actual program viewing, and the like. In PTL 2, the program selection process is performed by extracting a keyword from a program guide or speech information and comparing the extracted keyword with the profile.

Patent Literature 3 (PTL 3) discloses a technology which presents a user with program information relating to a keyword having been input by the user, by searching an electronic program guide for program information which matches the keyword and, if no such matching program information is found, performing search on the internet according to the input keyword.

Patent Literature 4 (PTL 4) discloses a technology which detects keywords from the subject or body of an e-mail and, when there is any keyword matching a search word having been input by a searcher, displays an important person in the e-mail exchange. PTL 4 discloses also a technology which converts speech content for each attendee in a conference into text by speech recognition and, from the generated text, extracts a keyword according to the number of appearances.

Patent Literature 5 (PTL 5) discloses a technology which, using Cookie, collects information reference tendency of each visitor on a site and, when returning a response of a service, performs the returning after automatically adding additional information prepared in advance which is considered to be effective according to the information reference tendency.

CITATION LIST

Patent Literature

[PTL 1] Japanese Laid-Open Patent Application No. 2015-099290
[PTL 2] Japanese Laid-Open Patent Application No. 2000-023112
[PTL 3] Japanese Laid-Open Patent Application No. 2004-362121
[PTL 4] Japanese Laid-Open Patent Application No. 2010-079872
[PTL 5] Japanese Laid-Open Patent Application No. 2003-085081

SUMMARY OF INVENTION

Technical Problem

A note with regard to content of a voice call, such as described above, may be displayed in a display area of some kind of device. However, there is often limitation on such a display area. Accordingly, it is desired to select and display information which is highly valuable to a user, that is, specific to the user.

PTL 1 discloses extracting a keyword from speech information on the basis of information input by a user and presenting the extracted keyword. However, in PTL 1, a keyword list is generated from text information input by the user and any word matching the keyword list is extracted as a keyword. That means that it is impossible to extract, as a keyword, any word not having been input by the user. Accordingly, PTL 1 has an issue in that it is likely that information specific to the user cannot be extracted.

Further, while PTL 2 to PTL 4 disclose presenting information on the basis of information input by a user or of the user's interest, they do not disclose extracting and displaying information specific to the user.

The present invention has been made in view of such an issue, and accordingly is primarily aimed at providing an information processing device which is capable of extracting information specific to a user from speech data.

Solution to Problem

An information processing device according to one aspect of the present disclosure includes:
speech recognition means for generating a character string based on speech data;
filtering means for filtering one or more keywords extracted from the character string generated by the speech recognition means, based on one or more words which are relevant to a speaker of the speech data and stored in advance; and output means for outputting a result of the filtering performed by the filtering means.

An information processing method according to one aspect of the present disclosure includes:

generating a character string based on speech data;

filtering one or more keywords extracted from the character string generated by the speech recognition means, based on one or more words which are relevant to a speaker of the speech data and stored in advance; and outputting a result of the filtering performed by the filtering means.

A storage medium according to one aspect of the present disclosure, the storage medium storing a program that causes a computer to execute:

a process of generating a character string based on speech data;

a process of filtering one or more keywords extracted from the character string generated by the speech recognition means, based on one or more words which are relevant to a speaker of the speech data and stored in advance; and a process of outputting a result of the filtering performed by the filtering means.

Advantageous Effects of Invention

As described above, according to the present invention, an effect of enabling extraction of information specific to a user from speech data is achieved.

BRIEF DESCRIPTION OF DRAWINGS

FIG. 6A is a diagram showing an example of personal information generated by the personal information generation unit of the communication terminal according to the first example embodiment of the present invention.

FIG. 6B is a diagram showing another example of personal information generated by the personal information generation unit of the communication terminal according to the first example embodiment of the present invention.

FIG. 6C is a diagram showing still another example of personal information generated by the personal information generation unit of the communication terminal according to the first example embodiment of the present invention.

FIG. 8A is a diagram showing a result of sentence analysis performed by a sentence analysis unit of the analysis device according to the first example embodiment of the present invention.

FIG. 8B is a diagram showing keywords extracted by a key word detection unit of the analysis device according to the first example embodiment of the present invention.

FIG. 10A is a diagram showing an example of a result of filtering performed by a filtering unit of the communication terminal according to the first example embodiment of the present invention.

FIG. 10B is a diagram showing another example of a result of the filtering performed by the filtering unit of the communication terminal according to the first example embodiment of the present invention.

FIG. 11A is a diagram showing an example of personal information registered in the communication terminal according to the first example embodiment of the present invention.

FIG. 11B is a diagram showing another example of personal information registered in the communication terminal according to the first example embodiment of the present invention.

FIG. 11C is a diagram showing still another example of personal information registered in the communication terminal according to the first example embodiment of the present invention.

DESCRIPTION OF EMBODIMENTS

Hereinafter, example embodiments of the present invention will be described with reference to drawings.

First Example Embodiment

Figure 1:
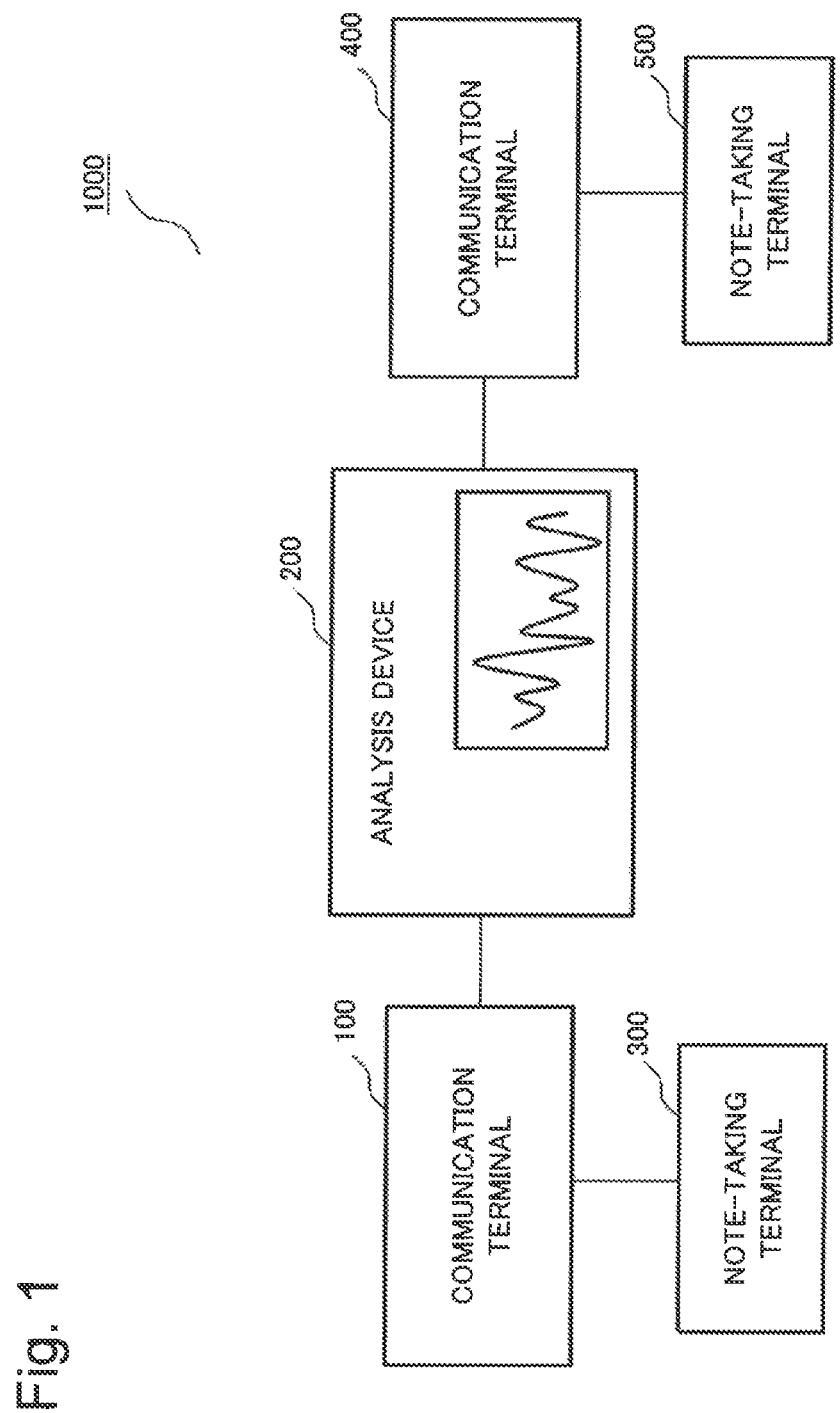
FIG. 1 is a block diagram showing a configuration of an information processing system according to a first example embodiment of the present invention.

FIG. 1 is a block diagram showing a configuration of an information processing system 1000 according to a first example embodiment of the present invention. As shown in FIG. 1, the information processing system 1000 according to the first example embodiment includes communication terminals 100 and 400, an analysis device 200 and note-taking terminals 300 and 500. In the information processing system 1000 according to the first example embodiment, content of a voice call between the communication terminals 100 and 400 is analyzed in the analysis device 200, keywords are thereby extracted, filtering the extracted keywords is performed, and the result is displayed in, for example, the note-taking terminals 300 and 500.

Hereinafter, each of the constituent elements will be described with reference to drawings.

Figure 2:
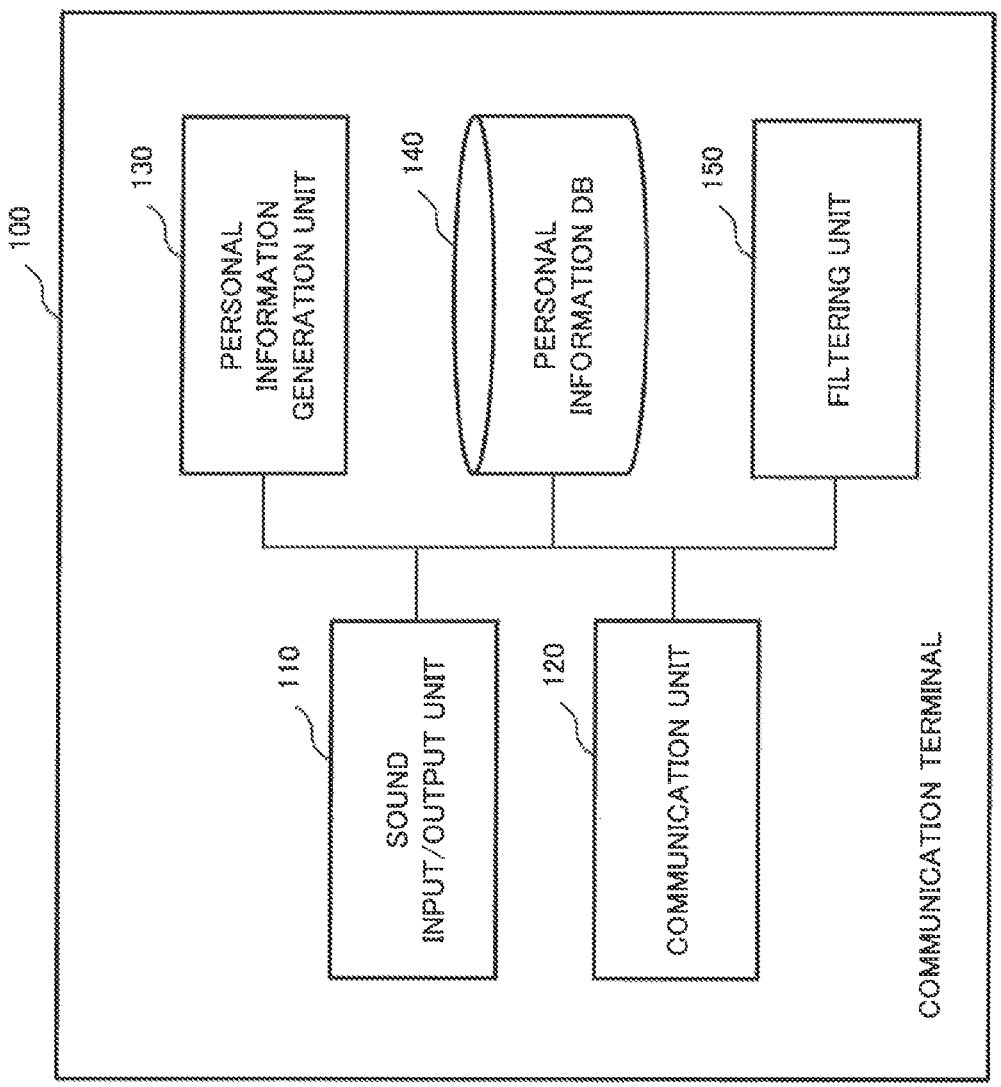
FIG. 2 is a block diagram showing a configuration of a communication terminal in the information processing system according to the first example embodiment of the present invention.

FIG. 2 is a block diagram showing a configuration of the communication terminal 100 in the information processing system 1000 shown in FIG. 1. As shown in FIG. 2, the communication terminal 100 includes a sound input/output unit 110, a communication unit 120, a personal information generation unit 130, a personal information DB (Data Base) 140 and a filtering unit 150. The communication terminal 400 shown in FIG. 1 has a similar configuration to that of the communication terminal 100.

The communication terminal 100 is a terminal having a function to realize a voice call via a network. The sound input/output unit 110 of the communication terminal 100 includes, for example, a microphone for acquiring sounds or the like generated at the user (who is to speak) of the communication terminal 100 or in the surroundings, a speaker unit for outputting sounds or the like acquired via the network, and the like.

The communication unit 120 performs control of reception and transmission in a voice call, data communication or the like with another communication terminal or the like via the network.

The personal information generation unit 130 generates and updates personal information used by the filtering unit 150 described later, at any timing. The personal information generation unit 130 may update the personal information, for example, at a predetermined time interval such as every few days and every few weeks, or at a timing designated by the user. Here, the timing to generate and update the personal information is not limited to these examples.

The personal information DB 140 stores the personal information generated by the personal information generation unit 130.

The filtering unit 150 performs filtering process on the basis of the personal information stored in the personal information DB 140.

Figure 3:
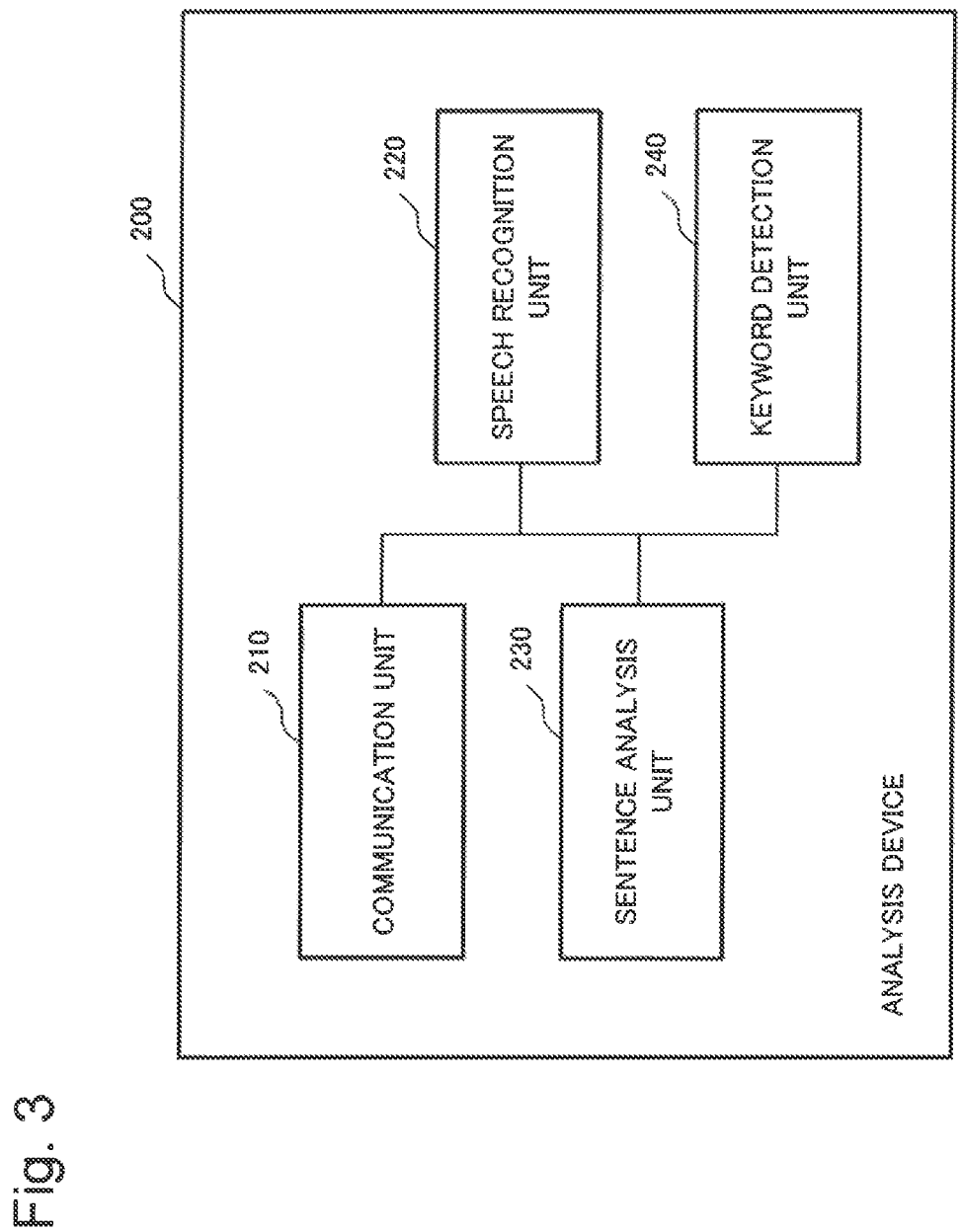
FIG. 3 is a block diagram showing a configuration of an analysis device according to the first exemplary embodiment of the present invention.

FIG. 3 is a block diagram showing a configuration of the analysis device 200 in the information processing system 1000 shown in FIG. 1. As shown in FIG. 3, the analysis device 200 includes a communication unit 210, a speech recognition unit 220, a sentence analysis unit 230 and a keyword detection unit 240.

The communication terminals 100 and 400 shown in FIG. 1 are enabled to realize a voice call and data communication by a base station controller or switching equipment which controls communication between the communication terminals, and the analysis device 200 may be included in the base station controller or switching equipment.

The communication unit 210 of the analysis device 200 performs communication with another communication terminal or the like via the network. For example, the communication unit 210 acquires speech data exchanged between the communication terminals 100 and 400. The speech recognition unit 220 performs a speech recognition process on the speech data acquired by the communication unit 210, thereby converting the speech data into text data (a character string). On the generated text data, the sentence analysis unit 230 performs sentence analysis such as morphological analysis or dependency parsing. From a result of the sentence analysis, the keyword detection unit 240 detects keywords.

Figure 4:
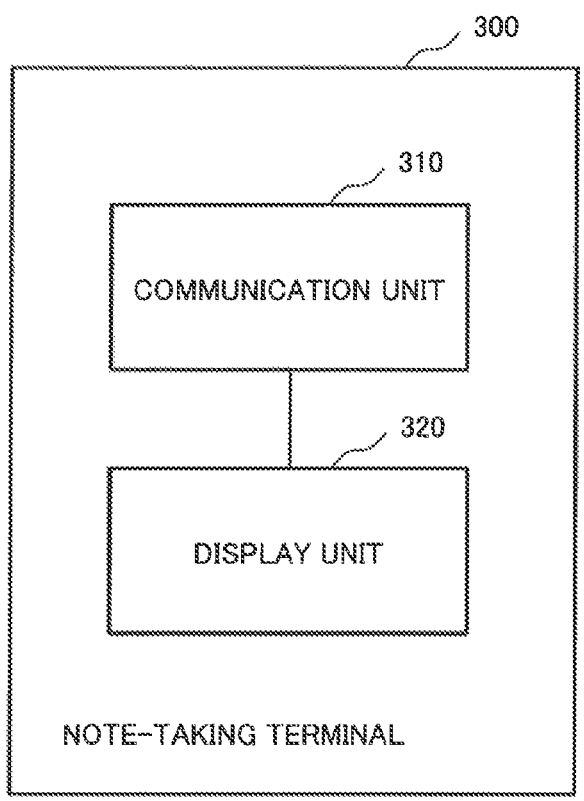
FIG. 4 is a block diagram showing a configuration of a note-taking terminal according to the first exemplary embodiment of the present invention.

FIG. 4 is a block diagram showing a configuration of the note-taking terminal 300 in the information processing system 1000 shown in FIG. 1. As shown in FIG. 4, the note-taking terminal 300 includes a communication unit 310 and a display unit 320.

The communication unit 310 performs communication with the communication terminal 100. The display unit 320 displays information acquired via the communication unit 310.

The note-taking terminal 500 has a similar configuration to that of the note-taking terminal 300. The note-taking terminals 300 and 500 may be, for example, wearable terminals each provided with a function to communicate with the respective communication terminals 100 and 400.

Figure 5:
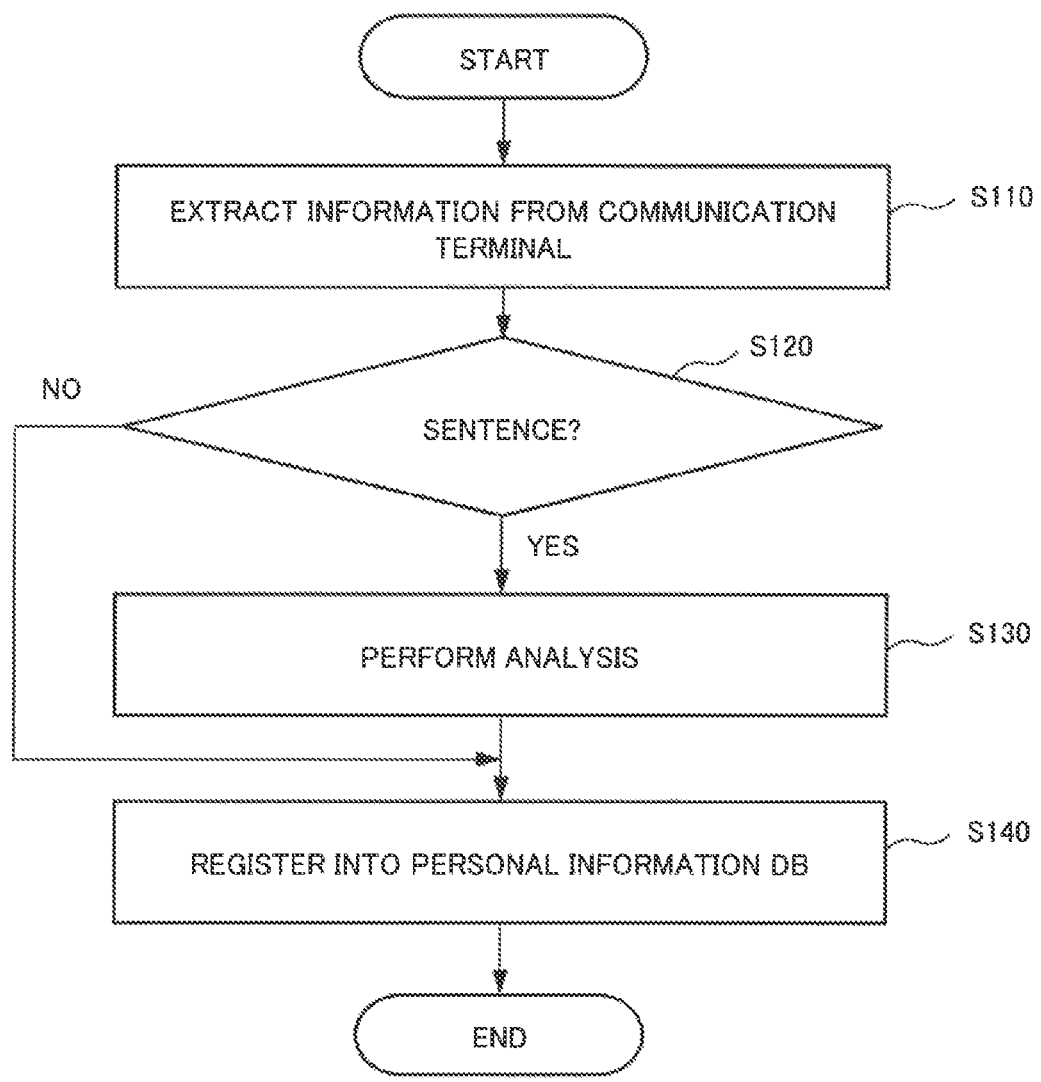
FIG. 5 is a flow chart showing operation of a personal information generation unit of the communication terminal according to the first example embodiment of the present invention.

FIG. 5 is a flow chart showing operation of the personal information generation unit 130 of the communication terminal 100. The personal information generation unit 130 generates personal information which is used by the communication terminal 100 to perform filtering on keywords acquired from the analysis device 200, which will be described later. Before the filtering described later, the personal information generation unit 130 generates personal information and registers the generated personal information into the personal information DB 140.

With reference to FIG. 5, the flow of generating personal information by the personal information generation unit 130 will be described below. Here, the personal information is information which is in accordance with a character of the user of the communication terminal 100 and is based on information included in e-mails (e-mail information), information included in SNS (Social Networking Service) (SNS information), and the like stored in a memory of the communication terminal 100.

From the above-described pieces of information stored in the memory of the communication terminal 100, the personal information generation unit 130 extracts information considered to be associated with the user (S110). If the extracted information is, for example, a sentence of an e-mail body (YES at S120), the personal information generation unit 130 performs sentence analysis such as morphological analysis, dependency parsing or the like on the sentence, thereby extracting morpheme information such as parts of speech (S130) (details will be described later). Based on the extracted information, the personal information generation unit 130 generates personal information and registers it into the personal information DB 140 (S140).

FIG. 6A to FIG. 6C are diagrams showing an example of personal information generated by the personal information generation unit 130. Specifically, the personal information generation unit 130 generates personal information as described below, for example.

That is, the personal information generation unit 130 extracts telephone book information registered in the memory of the communication terminal 100 and registers the extracted telephone book information into the personal information DB 140, as shown in FIG. 6A. The telephone book information thus registered includes partner information and content. The partner information includes persons' names registered in the telephone book, and the content includes related information stored in association with each of the persons' names, such as, for example, a phone number and an e-mail address. The content includes also a part of speech, a form and the like of each of the persons' names and of each of the pieces of related information, which are obtained as a result of morphological analysis, dependency parsing or the like.

The personal information generation unit 130 extracts also e-mail information from the memory and registers the extracted e-mail information into the personal information DB 140, as shown in FIG. 6B. The e-mail information thus registered includes partner information and content. The partner information includes names of senders/recipients of e-mails sent or received by the user, and the content includes, of each of the e-mails, a title, a body or information obtained by analyzing the body. The content includes also a part of speech, a form and the like of each of the persons' names and of each of the pieces of related information, which are obtained as a result of morphological analysis, dependency parsing or the like.

The personal information generation unit 130 extracts also SNS information from the memory and registers it into the personal information DB 140, as shown in FIG. 6C. The SNS information thus registered includes partner information and content. The partner information includes names of partners to or from whom the user sent or received messages or the like in SNS, and the content includes, of each of the messages, a title, a body or information obtained by analyzing the body. The content includes also a title or a body of an article posted to SNS, a friend relation registered in SNS, or a part of speech and the like obtained by analyzing them.

Figure 7:
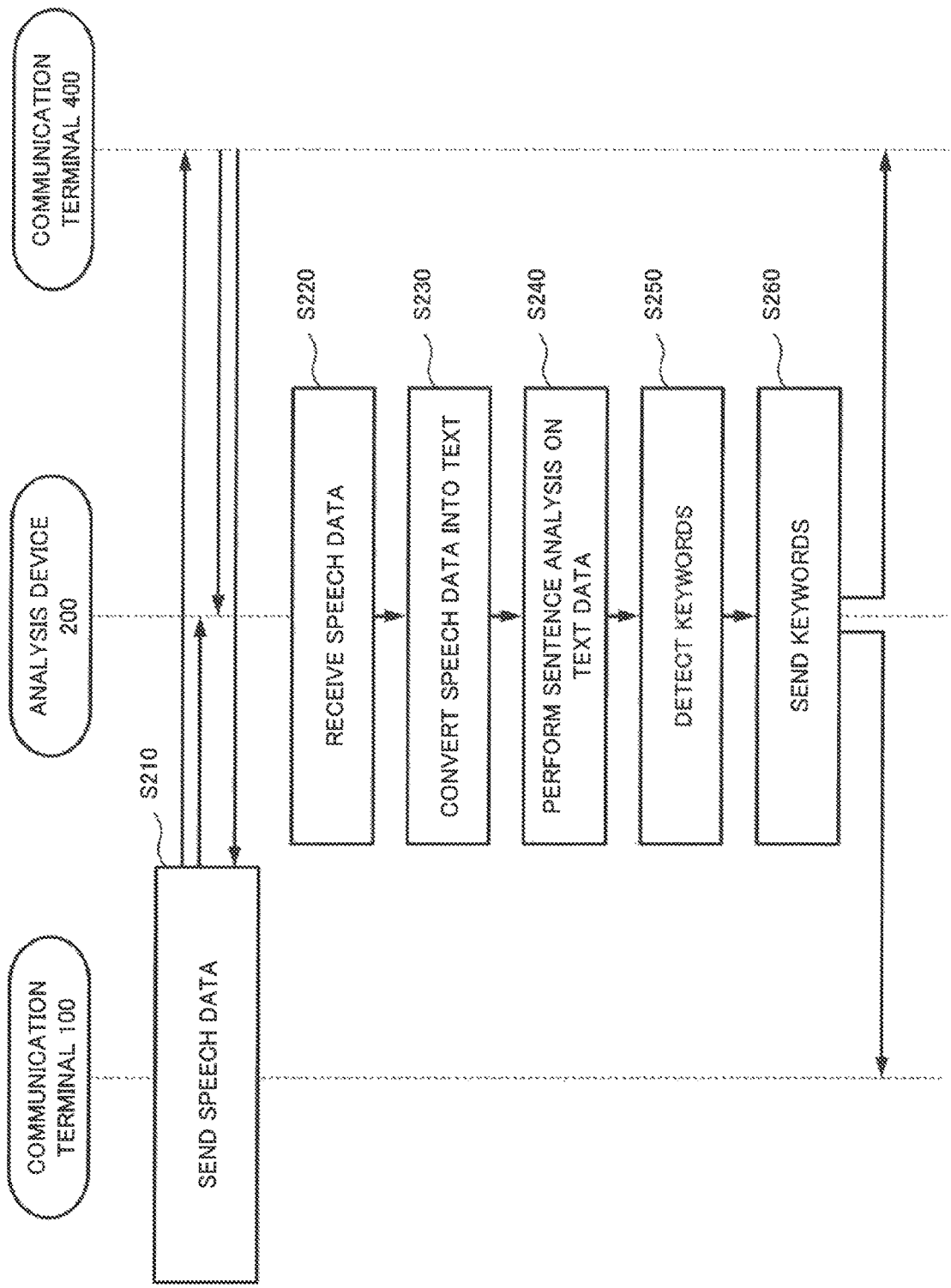
FIG. 7 is a sequence chart including a process of analysis performed by the analysis device according to the first example embodiment of the present invention.

FIG. 7 is a sequence chart illustrating a process in which the analysis device 200 analyzes speech data sent and received between the communication terminals 100 and 400. With reference to FIG. 7, the sequence of the analysis process performed by the analysis device 200 will be described below.

When starting communication for a voice call between the communication terminals 100 and 400, a base station control device and a switching equipment for controlling communication between the communication terminals 100 and 400 performs the control and thereby establishes a communication link between them. When a voice call between the communication terminals 100 and 400 has been enabled by the communication link establishment, speech data from the communication terminal 100 is sent to the communication terminal 400 (S210). Further, speech data from the communication terminal 400 is sent to the communication terminal 100. The analysis device 200 may be included in the base station control device or switching equipment described above, or may be any device arranged in the network. Here, a way of performing speech data exchange between the communication terminals 100 and 400 is not limited to the above-described one where the exchange is performed by establishing a communication link.

The analysis device 200 receives the speech data exchanged between the communication terminals 100 and 400 (S220).

It is assumed that the analysis device 200 acquires, at the communication unit 210 and from the communication terminal 100, speech data "A meeting on matter X will be held at 15 o'clock today. Meeting attendees from the other side on matter X are E-san and F-san."

The speech data acquired at the communication unit 210 is notified to the speech recognition unit 220. The speech recognition unit 220 performs a speech recognition process on the acquired speech data, thereby converting the speech data into text, and accordingly generates text data (S230). For the speech recognition process, general technology may be used.

The speech recognition unit 220 notifies the generated text data to the sentence analysis unit 230. The sentence analysis unit 230 performs sentence analysis such as morphological analysis on the acquired text data (S240). FIG. 8A is a diagram showing a result of the sentence analysis performed by the sentence analysis unit 230. As shown in FIG. 8, the sentence analysis unit 230 parses the text data into morphemes and also acquires, about the text data, surface information (Chinese character, basic form, reading and the like), part-of-speech information, inflection information and the like.

Further, the sentence analysis unit 230 performs sentence analysis such as dependency parsing on the generated text data, thereby acquiring phrase information, dependency information and the like.

Subsequently, from the analysis result obtained in S240, the keyword detection unit 240 detects keywords (S250). FIG. 8B is a diagram showing an example of keywords detected by the keyword detection unit 240. The keyword detection unit 240 may detect keywords on the basis of, for example, numerical value information and proper noun information obtained from the sentence analysis result.

Specifically, for example, the keyword detection unit 240 may extract or generate time information on the basis of the numerical value information and expressions such as "o'clock", "minutes" and "seconds" or such as "today" and "tomorrow", thereby detecting the time information as a keyword. In the example shown in FIG. 8B, it is suggested that a keyword "2016/03/30" is detected according to the expression "today", and a keyword "15:00" according to the expression "15 o'clock".

The keyword detection unit 240 may also detect location information or person's name information as a keyword on the basis of the proper noun information. In the example shown in FIG. 8B, it is suggested that keywords "matter X", "meeting", "matter X", "E-san" and "F-san" are detected according to the proper noun information. Further, the keyword detection unit 240 may detect any one which is not either a postpositional particle or an auxiliary verb, as a keyword.

When keywords have been detected in the above-described way, the analysis device 200 sends the detected keywords to at least one of the communication terminals 100 and 400, via the communication unit 210 (S260). Whether or not to send the keywords to the communication terminals 100 and 400 may be set in advance.

Figure 9:
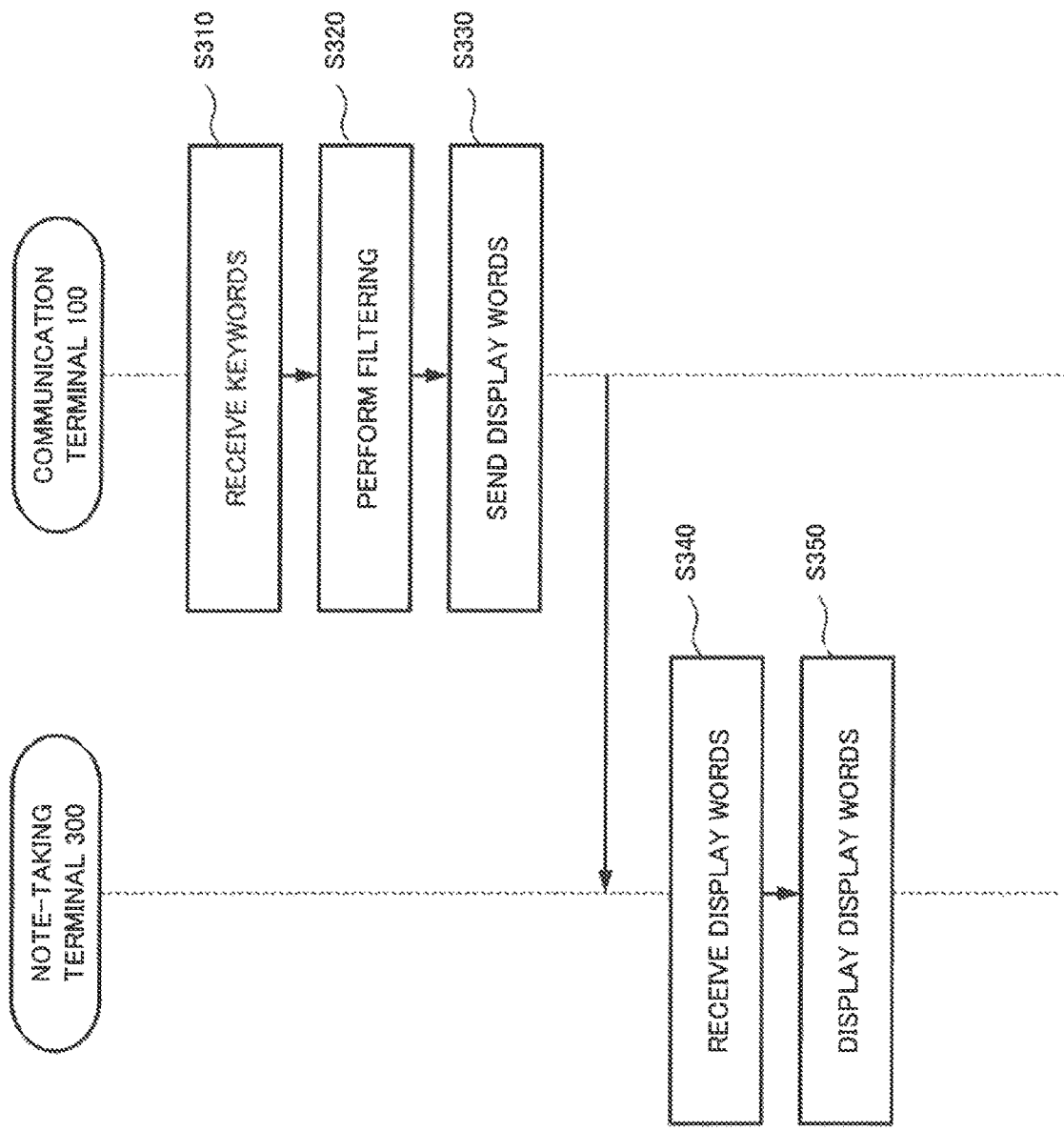
FIG. 9 is a sequence chart including a filtering process performed in the communication terminal and a process of displaying a result of the filtering, according to the first example embodiment of the present invention.

FIG. 9 is a sequence chart illustrating a process of filtering in the communication terminal 100 and displaying a result of the filtering in the note-taking terminal 300. With reference to FIG. 9, the process of filtering in the communication terminal 100 and displaying a result of the filtering will be described below.

The communication terminal 100 receives the keywords from the analysis device 200 described in S260 of FIG. 7, at the communication unit 120 (S310). The communication unit 120 notifies the received keywords to the filtering unit 150. The filtering unit 150 filters the received keywords by using the personal information DB 140 (details will be described later), thereby extracting display words (S320). Here, the display words are words which are extracted from the keywords by the filtering and are to be displayed in the note-taking terminal 300. The communication terminal 100 sends the extracted display words to the note-taking terminal 300, via the communication unit 120 (S330).

The note-taking terminal 300 receives the display words at the communication unit 310 (S340). The display unit 320 displays the received display words (S350).

Hereinafter, a description will be given of details of the filtering process performed by the filtering unit 150, which has been mentioned above in S320. By filtering the keywords received from the analysis device 200 on the basis of personal information stored in the personal information DB 140, the filtering unit 150 extracts keywords more specific to the user as display words.

Specifically, the filtering unit 150 may exclude any keyword which matches none of words included in the personal information, from display words. Further, the filtering unit 150 may perform the filtering on the basis of appearance frequencies of words included in the personal information. In that way, by excluding, from display words, any keyword having already appeared before regarding the keyword as already acquired information, displaying the same word more than once in the note-taking terminal 300 may be prevented.

FIG. 10A is a diagram showing an example of a result of (that is, display words obtained by) the filtering performed by the filtering unit 150 on the keywords shown in FIG. 8B. As shown in FIG. 10A, by performing the filtering based on appearance frequencies, it can be prevented that "matter X" appearing twice in the keywords shown in FIG. 8B is displayed twice.

Alternatively, because a frequently appearing keyword is considered to be already noticed by the user, the filtering unit 150 may exclude any keyword whose appearance frequency is more than a predetermined one, from display words.

Further, the filtering unit 150 may perform the filtering by using proper nouns included in e-mail information and SNS information about the voice call partner (recipient) which are registered in the personal information DB 140. That is, any proper noun other than those included in the e-mail information or SNS information about the voice call partner (recipient), registered in the personal information DB 140, may be excluded from display words. Thereby, in a case where the personal information DB 140 is updated every day or every week, for example, information about most recent topics is registered in the personal information DB 140, and it accordingly is possible to preferentially display currently hot topics or the like in the note-taking terminal 300.

Here, it is assumed that the user of the communication terminal 400 is "D-san". Because exchange with "D-san" is registered in the SNS information included in the personal information shown in FIG. 6C, the filtering unit 150 may include any word included in the content of the SNS information into display words. In the example shown in FIG. 10A, it is represented that, among the keywords shown in FIG. 8B, "E-san" included in the content of the SNS information about "D-san" is displayed but "F" not included in the content of the SNS information in the personal information is not displayed.

Here, the filtering may be performed such that the keyword "F-san" is included into display words when it is registered in the personal information in association with exchange with another person instead of exchange with D-san. Whether or not to include a keyword into display words may be determined depending on the number of words set in advance according to a limit of the display area.

Further, the filtering unit 150 may perform the filtering by using the telephone book information registered in the personal information DB 140. That is, the filtering unit 150 may avoid including any person's name not registered in the telephone book information into display words.

The filtering unit 150 may include, into display words, any information on date or time which is regarded as important for the user.

Further, the filtering unit 150 may include, into display words, any information regarded as specific to the user, as well as keywords detected by the keyword detection unit 240. FIG. 11A to FIG. 11C are diagrams showing an example of personal information for the user of the communication terminal 400, which is registered in the memory of the communication terminal 400 shown in FIG. 1.

It is assumed that, also in the communication terminal 400, the keywords shown in FIG. 8B are received from the analysis device 200. As shown in FIG. 11B, a word "company A matter X" is included in e-mail information in the personal information. Because "matter X" included in one of the keywords received from the analysis device 200 is thus partially included in the personal information, the filtering unit 150 includes "matter X" also into display words. Further, because the word "company A matter X" is included in the personal information, the filtering unit 150 may include also "company A" into display words, as shown in FIG. 10B, as a word associated with "matter X" included in the keywords. Thus, when a portion of any one of the words included in the personal information is included in the extracted keywords, the filtering unit 150 may include all portions of the word into display words.

The filtering unit 150 notifies the extracted display words to the communication unit 120. The communication unit 120 notifies the acquired display words to the communication unit 310 of the note-taking terminal 300. The communication unit 310 of the note-taking terminal 300 receives the display words, as already described in S340 of FIG. 9. The communication unit 310 notifies the received display words to the display unit 320. The display unit 320 displays the notified display words in the display area, as already described in S350 of FIG. 9.

Here, in response to clicking any of the display words thus displayed on the display unit 320 of the note-taking terminal 300, starting a phone call or search for the display word on the Internet may be executed. Specifically, when a phone number is displayed on the note-taking terminal 300 and is then clicked, the phone number may be sent to the communication terminal 100, and the communication terminal 100 may subsequently start a phone call to the phone number. Alternatively, when a display word is displayed on the note-taking terminal 300 and is then clicked, the display word may be sent to the communication terminal 100, and search for the display word on the Internet may be subsequently performed in the communication terminal 100.

As has been described above, according to the present example embodiment, the communication terminal 100 generates personal information based on information stored in the terminal and filters keywords extracted from speech data exchanged between communication terminals based on the personal information. By employing the configuration, words to be displayed in the note-taking terminal 300 are extracted according to such as appearance frequencies of words relating to the user and whether or not a keyword is included in the personal information. Accordingly, an effect of enabling extraction of words specific to the user is achieved, according to the present example embodiment. Also achieved is an effect of accordingly enabling preferential display of information highly valuable to the user even when the display area of the note-taking terminal is limited.

In the present example embodiment, the above descriptions have been given of a configuration in which the personal information DB 140 and the filtering unit 150 are included in the communication terminal 100, but there may be employed a configuration in which the personal information DB 140 and the filtering unit 150 are included in, for example, another device capable of communicating with the communication terminal 100 (referred to as a "display word notification device"). In that case, the keyword detection unit 240 of the analysis device 200 sends detected keywords to the display word notification device. The display word notification device performs filtering in a similar way to that in S320 of FIG. 9 and notifies the result to the note-taking terminal 300. Further, the analysis device 200 and the display word notification device may be disposed in the same housing.

In the present example embodiment, the above descriptions have been given of a configuration in which the note-taking terminals 300 and 500 are included as devices separated from respectively the communication terminals 100 and 400, but there may be employed a configuration in which the communication terminals 100 and 400 respectively include functions to work as the note-taking terminals 300 and 500.

In the present example embodiment, the above descriptions have been given of a case of a voice call between two persons, but the present example embodiment is not limited to the case of a voice call between two persons but may be applied to a case where exchange is made among more than two speakers, such as a telephone conference. Further, when a message is stored in an answering machine, display words may be extracted from the message and displayed in the note-taking terminal. In that case, the configuration may be such that the communication terminals 100 and 400 each include the speech recognition unit 220. Further, display words may be extracted from area broadcast or the like and displayed in the note-taking terminal.

Second Example Embodiment

Hereinafter, a description will be given of a second example embodiment corresponding to a basic configuration of the first example embodiment.

Figure 12:
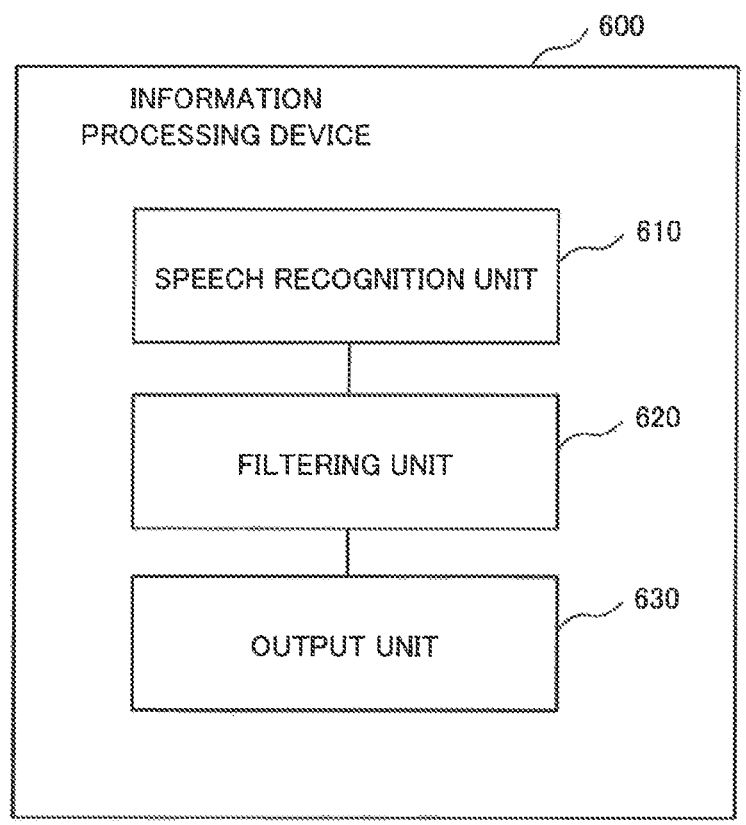
FIG. 12 is a block diagram showing a configuration of an information processing device according to a second example embodiment of the present invention.

FIG. 12 is a block diagram showing a configuration of an information processing device 600 according to the second example embodiment of the present invention. As shown in FIG. 12, the information processing device 600 according to the second example embodiment includes a speech recognition unit 610, a filtering unit 620 and an output unit 630.

The speech recognition unit 610 generates a character string on the basis of speech data. The filtering unit 620 performs filtering on one or more keywords extracted from the character string generated by the speech recognition unit 610, on the basis of one or more words relevant to the speaker of the speech data which are stored in advance. The output unit 630 outputs a result of the filtering performed by the filtering unit 620.

The speech recognition unit 610, the filtering unit 620 and the output unit 630 of the second example embodiment may be presented as an example of those for implementing, respectively, the speech recognition unit 220, the filtering unit 150 and the communication unit 210 in the first example embodiment, but there is no limitation to the example.

According to the second example embodiment, by employing the above-described configuration, filtering the keywords is performed based on words relevant to the speaker of the speech data, and accordingly an effect of enabling extraction of information specific to the user is achieved.

Figure 13:
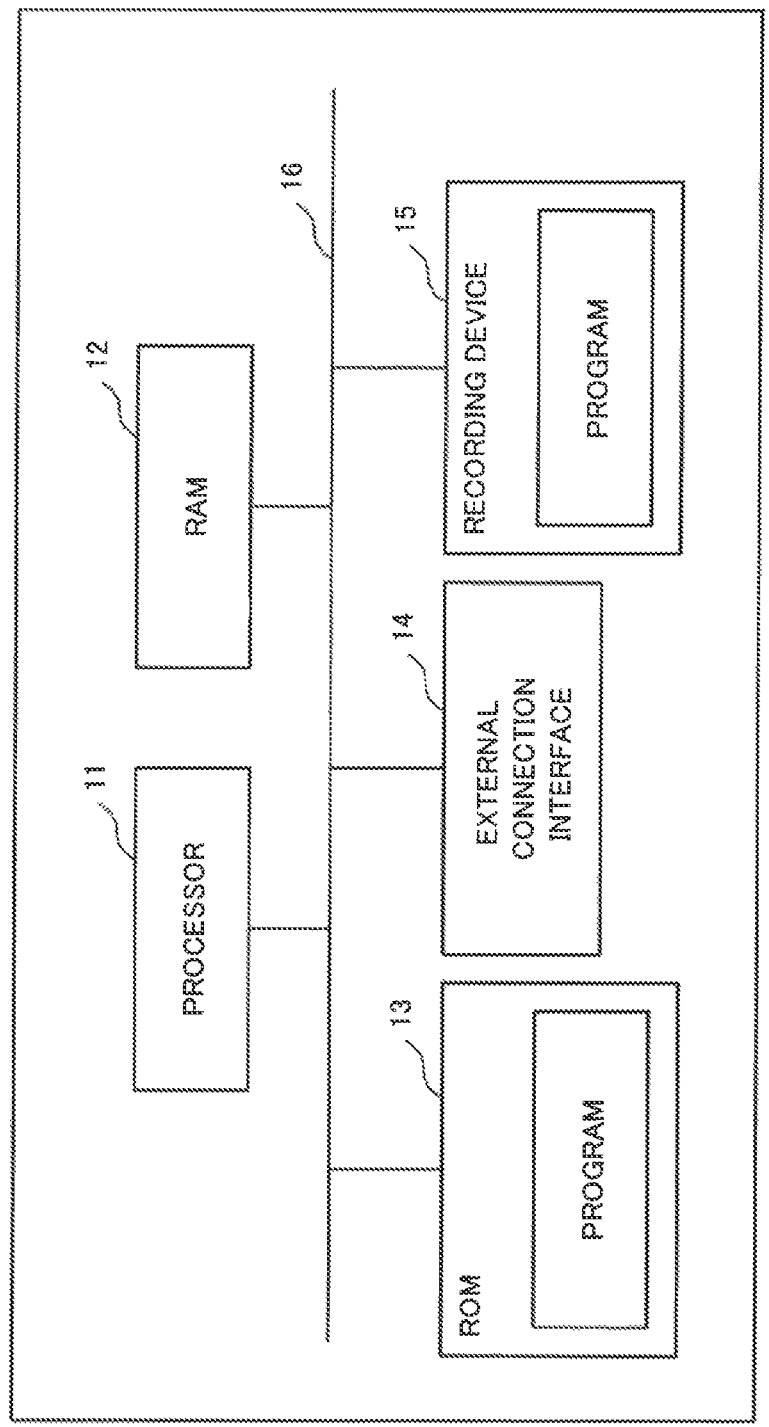
FIG. 13 is a diagram showing an example of a hardware configuration for implementing devices presented in the example embodiments.

The units of the devices shown in FIG. 2 and the like are implemented in hardware resources illustrated in FIG. 13. Specifically, the configuration shown in FIG. 13 includes a processor 11, a RAM (Random Access Memory) 12, a ROM (Read Only Memory) 13, an external connection interface 14, a recording device 15 and a bus 16 for connecting the constituent elements with each other.

In each of the example embodiments described above, the descriptions have been given of a case, as an example of implementation by the processor 11 shown in FIG. 13, where the functions described in the example embodiment is realized by supplying a computer program capable of realizing the functions to the communication terminals 100 and 400 and the analysis device 200, and by the processor 11 subsequently reading the computer program into the RAM 12 and executing it. However, the functions represented as respective device blocks illustrated in FIG. 2 and the like may be partially or wholly implemented as hardware.

The computer program supplied as above may be stored in a readable/writable memory (temporary storage medium) or a computer readable storage device such as a hard disk drive. In such a case, the present invention can be regarded as being configured by a recording medium storing the computer program or code representing the computer program.

The present invention has been described above with reference to the example embodiments. However, the present invention is not limited to the above-described example embodiments. That is, the present invention may include various aspects understandable to those skilled in the art, such as a variety of combinations or selections of the constituent elements disclosed above, within the scope of the present invention.

This application is based upon and claims the benefit of priority from Japanese Patent Application No. 2016-191298 filed on Sep. 29, 2016, the disclosure of which is incorporated herein in its entirety by reference.

REFERENCE SIGNS LIST 11 processor
12 RAM
13 ROM
14 external connection interface
15 recording device
16 bus
100 communication terminal
110 sound input/output unit
120 communication unit
130 personal information generation unit
140 personal information DB
150 filtering unit
200 analysis device
210 communication unit
220 speech recognition unit
230 sentence analysis unit
240 keyword detection unit
300 note-taking terminal
310 communication unit
320 display unit
400 communication terminal
500 note-taking terminal
600 information processing device
610 speech recognition unit
620 filtering unit
630 output unit
1000 information processing system

The invention claimed is:

1. An information processing device comprising:
a memory storing instructions; and
one or more processors configured to execute the instructions to:
generate a character string based on speech data;
extract one or more keywords detected from the character string generated, based on one or more words relevant to a speaker of the speech data and stored in advance, wherein the one or more words relevant to the speaker include one or more words in texts exchanged between the speaker and a listener of the speech data; and
output the one or more keywords extracted.

2. The information processing device according to claim 1, wherein
the one or more processors are further configured to execute the instructions to:
exclude, out of the one or more keywords extracted, a keyword not matching any of the one or more words relevant to the speaker.

3. The information processing device according to claim 1, wherein
the one or more processors are further configured to execute the instructions to: include or exclude, into or from the keywords extracted, the word relevant to the speaker according to appearance frequency of the word.

4. The information processing device according to claim 1, wherein
the one or more words relevant to the speaker include words extracted from information on e-mails exchanged with the listener of the speech data, the information being stored in a communication terminal used by the speaker.

5. The information processing device according to claim 1, wherein
the one or more words relevant to the speaker include words extracted from information on SNS with the listener of the speech data, the information being stored in the communication terminal used by the speaker.

6. The information processing device according to claim 1, wherein
the one or more processors are further configured to execute the instructions to:
output, when a portion of any one of the words relevant to the speaker is included in any one of the keywords extracted, all portions of the word.

7. An information processing method comprising:
generating a character string based on speech data;
extracting one or more keywords detected from the character string generated, based on one or more words which are relevant to a speaker of the speech data and stored in advance, wherein the one or more words relevant to the speaker include one or more words in texts exchanged between the speaker and a listener of the speech data; and
outputting the one or more keywords extracted.

8. A non-transitory storage medium storing a program that causes a computer to execute:
a process of generating a character string based on speech data;
a process of extracting one or more keywords detected from the character string generated, based on one or more words which are relevant to a speaker of the speech data and stored in advance, wherein the one or more words relevant to speaker include one or more words in text exchanged between the speaker and a listener of the speech data; and
a process of outputting the one or more keywords extracted.

* * * * *